June 3, 1930.     C. R. ROOF     1,761,642
APPARATUS FOR FORMING NUTS
Filed Nov. 15, 1927    2 Sheets-Sheet 1

INVENTOR.
Charles R. Roof
BY
William W. Verney
ATTORNEYS.

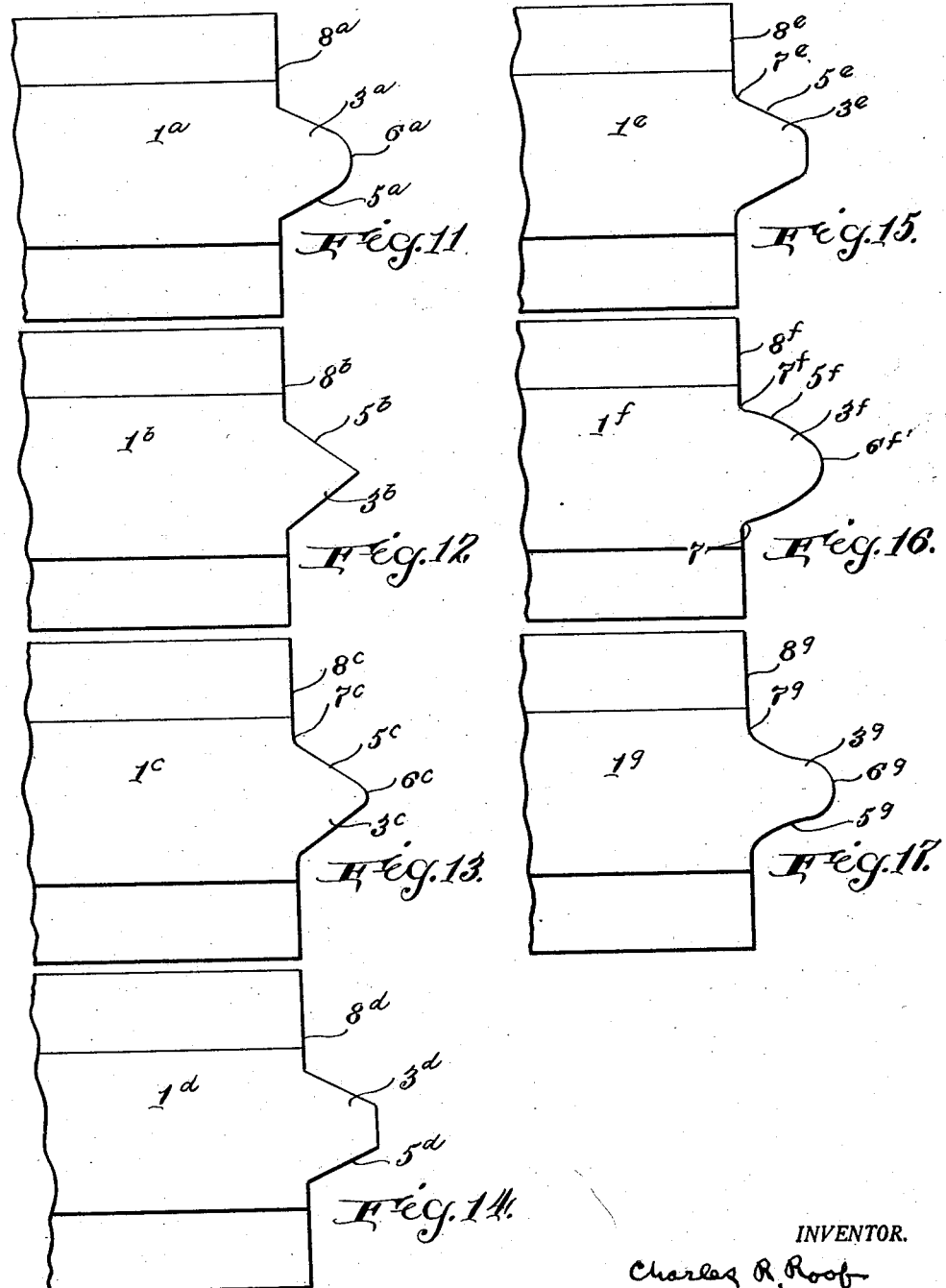

Patented June 3, 1930

1,761,642

UNITED STATES PATENT OFFICE

CHARLES R. ROOF, OF BALTIMORE, MARYLAND

APPARATUS FOR FORMING NUTS

Application filed November 15, 1927. Serial No. 233,379.

This invention relates to an improved tool for forming hot pressed nuts.

A further object of this invention relates to improvements in crowning tools for use in nut machines, having in view especially the forming of grip nuts of an improved type.

A further object of my invention is the producing of a tool for pressing a nut, of such character as to insure a perfect nut without cold shots or forging strains.

A further object of my invention is the producing of a tool for pressing a nut, of such character that when the sides of the nut are bent in, the corners of the thread will not hook over.

With the foregoing and other objects in view, my invention consists of the combination and arrangement of systems, apparatus and means as hereinafter specifically provided and illustrated in the accompanying drawings, wherein is shown the preferred embodiment of my invention, but it is understood that changes, variations and modifications may be resorted to which come within the scope of the claim hereunto appended.

Figure 1:
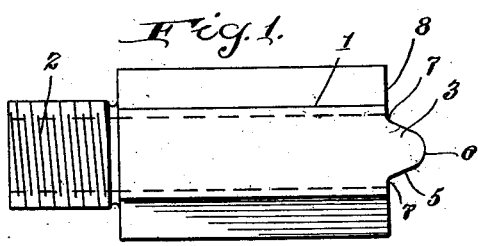
Figure 3:
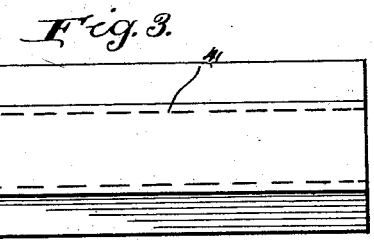
Figure 2:
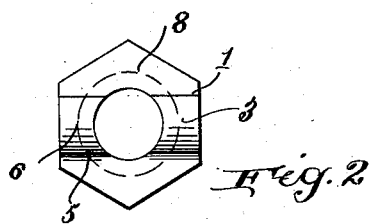
Figure 4:
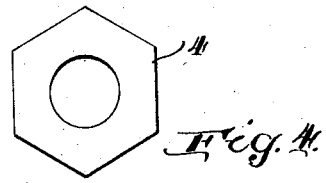
Figure 5:
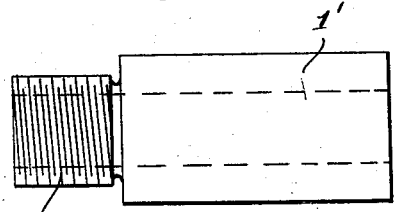
Figure 7:
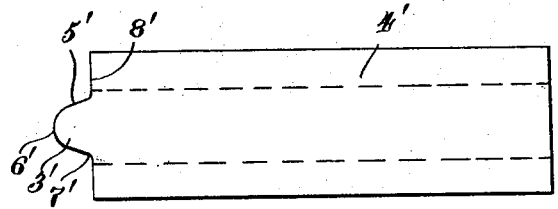
Figure 6:
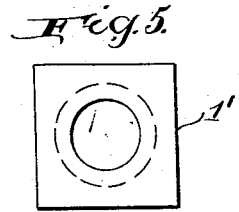
Figure 8:
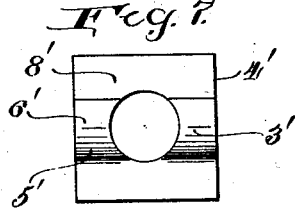
Figure 9:
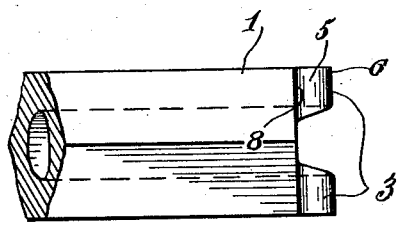
Figure 10:
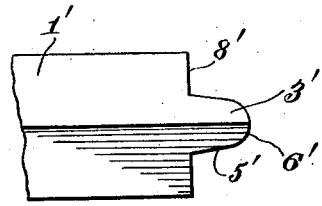

In the drawings, I have shown an improved tool for suitably carrying out my invention. Figure 1 is a side view in elevation of my improved crowning tool for forming hexagonal nuts in a nut machine, detached from the machine in which it is to operate; Fig. 2 is an end, or face, view of the crowning tool shown in Fig. 1, looking at the operative face thereof; Fig. 3 is a side view in elevation of a cut-off tool used in conjunction with the crowning tool shown in Fig. 1 for making nuts in a nut machine; Fig. 4 is an end, or face, view of the cut-off tool shown in Fig. 3, looking at the operative face thereof; Fig. 5 is a side view in elevation of a crowning tool used in a nut machine for forming square nuts; Fig. 6 is an end, or face, view of the crowning tool shown in Fig. 5, looking at the operative face thereof; Fig. 7 is a side view in elevation of a cut-off tool used in conjunction with the crowning tool shown in Fig. 5, for making nuts in a nut machine, wherein the projection is on the cut-off tool instead of on the crowning tool; Fig. 8 is an end, or face, view of the cut-off tool shown in Fig. 7, looking at the operative face thereof; Fig. 9 is a plan view of the operative end of the crowning tool shown in Fig. 1, broken off, taken at right angles to the view shown in Fig. 1; Fig. 10 is a view in elevation of a square cut-off tool broken off, the projection on the face thereof running diagonally across the face to diagonal opposite corners in a modified form; Figs. 11, 12, 13, 14, 15, 16 and 17, show modified forms of the projection used on the operative face of the crowning tool or the cut-off tool. The projection ordinarily extends between parallel faces of the nut, and in cross-section is shown in the above Figs. 11–17. I do not wish to limit myself, however, to having said projection extend between parallel faces, as in nuts used by municipalities wherein five sides are used, or three sides are used on the nut the projection may extend between a face and the juncture of two faces, or it may extend in other cases between the points or juncture of two faces, without in any way affecting the spirit of my invention, or the claims thereof.

The tools for forming certain classes of nuts, such as, the finished type of machine nuts, have the projection on the crowner, whereas, railroad nuts have the projection on the cut-off. In this specification and claims, when I use the term "tool," I mean either the crowner or the cut-off tool; and when I use the term "projection," in this specification and claims, I mean a projection of greater depth than a semi-circle to form a cavity in a nut having extended sides, or deeper than it is possible to form with a semi-circular projection.

In practice, it has been found that on pressing nuts from hot bar stock without a groove, a projection of depth equaling its width, such as a semi-circle, makes a groove wider than the tap hole in the nut when the groove is made deep enough for practical purposes. To overcome this difficulty, and to enable a nut machine to press properly formed nuts of the character shown, I have found that elongated sides with a considerable draught were necessary.

I have also found that nuts of the character described may be pressed from hot flat metal bar by pressing the groove in the same with flaring sides, and for finish, or strength, as circumstances may require, I have found it advantageous to provide a juncture of the sides with the face with a curve, or connecting the sides at the root with the fillets.

I have provided the forming tools herein described with holes through which the piercer operates when the nut is held between the cut-off tool and the crowner, the piercer forming the hole in the center of the nut. I have not shown the same, as it is well-known, and I claim nothing concerning it.

The forming tool shown in this application is for use in the ordinary, well-known nut machine, or press, and co-operates with the presser, cut-off dies and other appliances known to machines.

Similar numerals refer to similar parts throughout the several views.

1 is the body of the crowner. 2 is the threaded end of the crowner, which is secured in the nut machine. 3 is the projection on either the crowner or the cut-off tool. 4 is the cut-off tool. 5 are the sides of the projection. 6 is the curved portion of the projection joining the sides 5, and forms the fillets in the root of said nut. 7 are fillets joining the projection to the face of the tool, and form the curved portion joining the face to the sides of the groove of the nut. 8 is the face of the tool. When I use the term "face," it may be taken to mean the face of the crowner, or the face of the cut-off tool, when the projection is on the cut-off tool.

In certain classes of work it is found desirable to have a fillet 7 connecting the sides 5 of the projection to the face 8, and to have a curved portion 6 at the end of the sides to connect such sides 5 of the projection. In some cases, both fillets 7 and curved portion 6 are used in the same nut, and sometimes only one is used, and it may be either; often neither is used, depending in each case upon the character of the nut, the use to which it is to be applied and the character of the metal worked upon, both as to quality and temperature, hotter metal requiring different treatment than cooler metal in its working in the machine.

In Figs. 5–8, inclusive, and Fig. 10, wherein a square tool is shown, the several parts are designated by numerals primed to avoid confusion with the parts designated by similar numerals in other views. In Figs. 11 to 17 inclusive modified forms of projections used on the operative face of the tool are shown. The several parts are designated by the same numerals as in Fig. 1 with exponents "a" to "g" respectively. Thus the body in Fig. 11 is designated $1^a$ and the projection in Fig. 17 as $3^g$.

Having thus described my invention, what I claim and desire to secure by Letters Patent is:

In a tool for making nuts, provided with forming and cutting off parts either of which is provided with a crowning face and comprising a recess forming bead placed diametrically across the said face and having an extreme width greater than the projection of the bead and less than the bore diameter of the nut, and having elongated sides progressively converging towards each other.

CHARLES R. ROOF.